March 12, 1935. W. E. WOODARD 1,993,983
TRANSMISSION AND CONTROL OF POWER IN LOCOMOTIVES AND THE LIKE
Filed Oct. 9, 1931 7 Sheets-Sheet 5

Patented Mar. 12, 1935

1,993,983

UNITED STATES PATENT OFFICE 1,993,983

TRANSMISSION AND CONTROL OF POWER
IN LOCOMOTIVES AND THE LIKE

William E. Woodard, Forest Hills, N. Y.

Application October 9, 1931, Serial No. 567,870

15 Claims. (Cl. 74—472)

This invention relates to the transmission of power and the control of prime mover means delivering power, through variable-ratio transmission mechanism; and it comprehends an advantageous method of transmission and control as well as certain structure capable of carrying out the method.

More specifically, I contemplate the transmission of power from, and the control of, an internal combustion prime mover which delivers power (as, for example, to the wheels of a vehicle) through a selective gear transmission in such manner as to accommodate the operation of the prime mover to the different ratios selected, and preferably the automatic operation of such transmission and control mechanism. These advantages, and others, will be more apparent from a brief consideration of prior practice.

Heretofore, in the transmission of power from the prime mover of a vehicle to its wheels, when making a change from one transmission ratio to another, it has been necessary to alter the speed of, and delivery of power from, the prime mover to suit the changed conditions in the operation of the transmission, which has been customarily accomplished by declutching the prime mover from the transmission, simultaneously manipulating the throttle, altering the transmission ratio, re-engaging the clutching mechanism, and again simultaneously manipulating the throttle. Such operation provides at best, only an approximation of the desired accommodation of the prime mover to varying conditions imposed by the varying transmission ratios upon the shaft driven by the prime mover, and it is especially disadvantageous in a vehicle used as a tractor for heavy loads and subject to great variation in the load to be handled, such as a locomotive, since it introduces sharp lags and surges in the draw-bar pull.

Furthermore, the customary mode of transmitting power in vehicles, and the usual mechanisms for delivering the power, involve the interruption of the application of the power from the motor to the wheels and hence a failure to utilize the potential continuous power output of the motor. As a consequence, especially in hauling heavy loads, or in ascending grades, a part of the momentum gained during operation on one ratio is lost while making a change to the next ratio; and it is impossible to obtain a smooth and uniform rate of acceleration or the maximum acceleration under all conditions.

The foregoing difficulties and disadvantages are much aggravated with increase in size, weight and power of the locomotive or other vehicle; the gear shifting or other ratio-changing apparatus, the clutch mechanism, and the throttle controls being necessarily of increased size, complication, and difficulty of operation, and the loads to be transmitted and the stresses imposed in service being of greater moment. This fact has put a practical limit upon the application of internal-combustion power and variable-ratio transmissions to locomotives, so that in units of larger power than approximately 100 or 150 H. P. various expedients have been resorted to, (for example, the electric transmission), which, however, inherently involve other difficulties, such as lowered efficiency, excessive weight, and increased cost.

By the present invention, such difficulties and disadvantages of the prior art are minimized or overcome. In general, the method of accomplishing these purposes involves changing the ratio of reduction in the driving connections between the prime mover and the wheels of the vehicle, when necessary or desired, with such rapidity as to avoid appreciable lag in torque delivered to the wheels, carrying out such change without interrupting or substantially altering the operation of the prime mover at the moment of such change, and thereafter controlling the speed or power output of the prime mover to accommodate it to the altered conditions imposed by the change in the ratio of reduction of the driving connections. The method of transmission and control further comprehends the automatic accomplishment of one or more steps of the method just defined, and particularly of the step of accommodating the operation of the prime mover to the said changes in the ratio of, and also changes in the operating conditions imposed upon, the driving connections. In conjunction with such automatic control, I contemplate superimposing thereupon a manual control by which the operator can limit the speed and power output of the prime mover to any desired maximum, and effecting this in such manner as to allow the automatic control to function freely up to such desired maximum.

Although other mechanisms may be employed and although the method of operation and control may be exercised with different types of vehicles, I have devised and have herein disclosed a novel form of mechanism of especial advantage in this connection and have illustrated it as being applied to an internal-combustion-engined locomotive, to which the invention is particularly adaptable.

Briefly, the mechanism contemplated by the invention comprises a fluid coupling or clutch interposed between the internal combustion engine of a locomotive and a selective speed or gear transmission for the locomotive, said coupling being capable of transmitting a predetermined limited torque and arranged to slip under certain predetermined conditions. In the speed reduction mechanism I preferably provide pneumatic, magnetic, or other quick-action motor devices, for shifting gears or engaging and disengaging suitable clutches. By this means I obtain a very rapid change from one ratio of reduction to another, and in fact changes are effected so rapidly as not to relieve the engine of load for any appreciable interval of time. At the moment the change is effected, the fluid or hydraulic coupling by slippage takes up the difference in R. P. M. between the engine shaft and the shafting which is coupled to the transmission. Thus, by co-relating the fluid coupling and the rapid-change transmission in this manner, important advantages are attained, as will appear more fully hereinafter.

To equalize the speed of revolution of the engine shaft and the driven shafting, as soon as possible after any given change in the transmission ratio, and thus to promptly reduce the coupling slippage to its normal minimum, I provide a governor for the engine control device or throttle, which governor is placed under the influence of said driven shafting or other part or parts at the driven side of the coupling. This governor device is so arranged that the range through which it acts and thus the range of operation of the engine is subject to a manual control or other suitable control means determinable at will.

All of the foregoing, together with numerous other objects and advantages incident to the invention will be more fully comprehended from the following description, taken together with the accompanying drawings, in which.

The locomotive mechanism, herein shown as a preferred embodiment of the invention, comprises in general a main frame 2 mounted on wheels 3 and carrying coupler mechanism 4, 4, and suitable superstructure including a cab 5, and a housing or hood 6 enclosing the Diesel engine or other suitable internal combustion prime mover indicated at 7. The engine 7 may be of any suitable, commercially available type (the details of which need not here be shown) having cooling means indicated generally at 8 actuated by suitable belt or other drive mechanism 9, and with an exhaust outlet or stack 10. A main fuel tank is also indicated at 11 (see Fig. 2).

The engine is also provided with means for controlling the speed and power output, as by the control of the amount and/or pressure of the fuel delivered to the cylinders, for example, by a fuel control valve 157. An idling valve 173 may also be provided, for idling operation of the engine when the locomotive is not running. The ordinary overspeed governor usually built into such engines is also preferably employed, although it will be understood that such a governor device is not to be confused with the governing mechanism hereinafter described as a part of my invention.

Figure 1A:
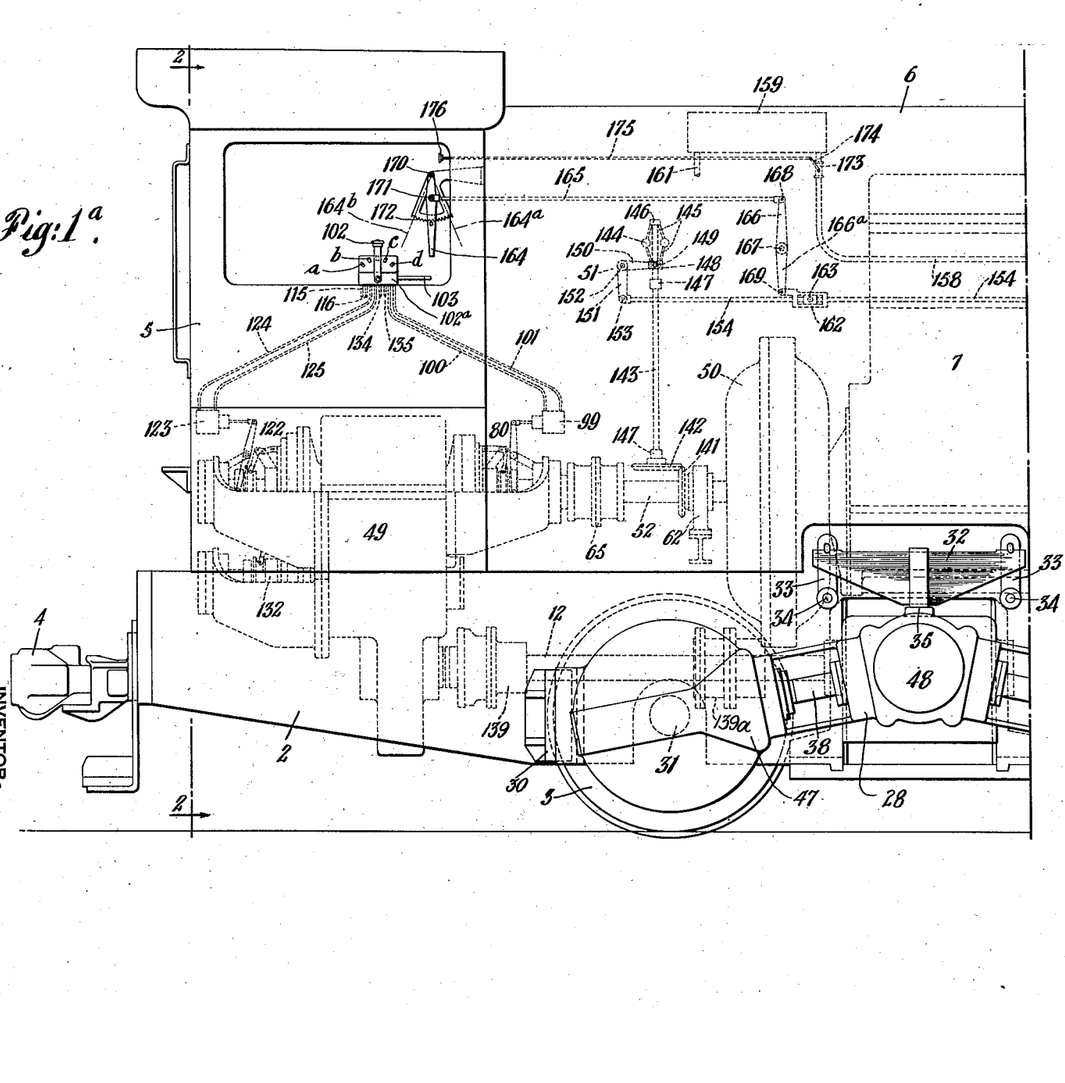
Figures 1a and 1b together form a side elevational view of a Diesel-powered locomotive arranged to be operated in accordance with, and embodying the particular construction of, the present invention, the major elements of the invention being indicated in their co-operative relationship.
Figure 1B:
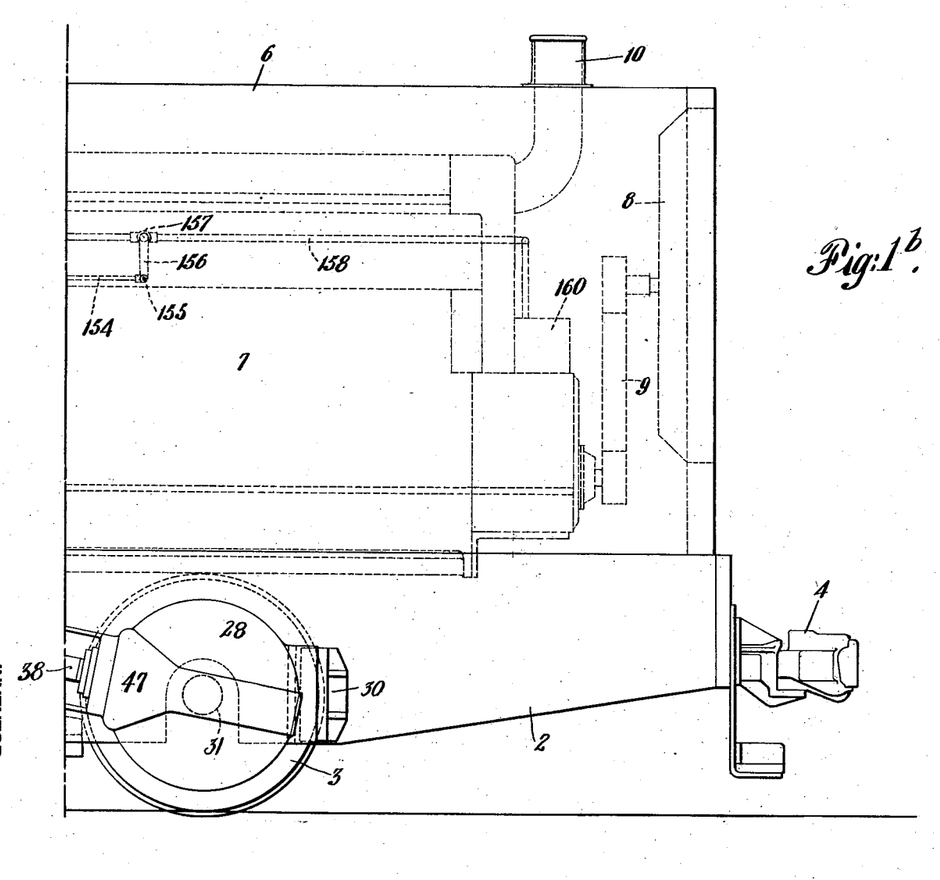
Figure 5:
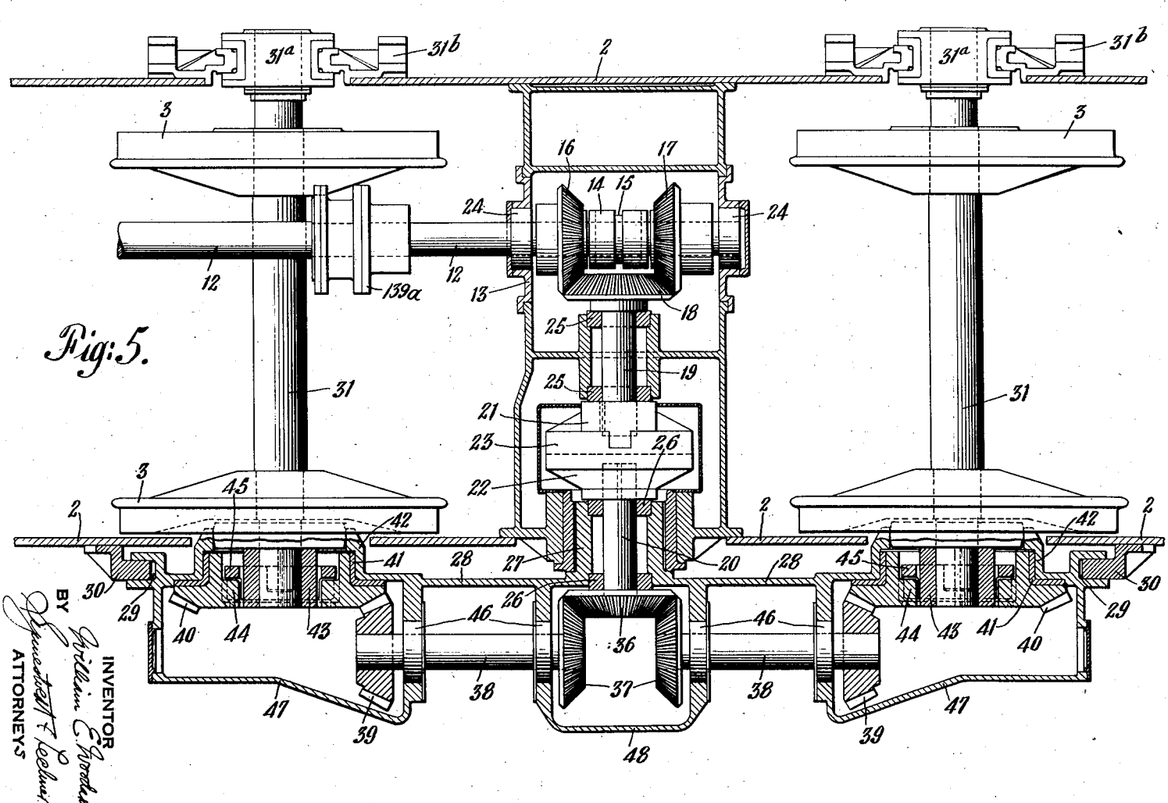
Figure 5 is an irregular plan section through certain parts of the locomotive driving mechanism closely associated with the wheels.

Although the running gear immediately associated with the wheels is not per se a part of my invention, it is in order to give here a brief description of the same, so that the application of the invention may be fully understood. Such running gear (as seen in Figures 1a, 1b and 5) preferably includes suitable shafting 12 extending forwardly from a variable-ratio transmission mechanism, hereinafter to be described, into a combined reversing-gear box and main frame cross-brace structure 13. By means of a suitable shiftable dual clutch member 14, which may be shifted forwardly and rearwardly by a suitable clutch operating fork (not shown) which engages the peripheral groove 15 of the clutch member, either of the reversing gears 16 and 17 may be clutched to the driving shaft 12, said gears being in mesh with the bevel gear 18 mounted fast on a transverse shaft 19. Said shaft 19, driven in either direction through the reversing mechanism just described, actuates the shaft 20 through the intermediation of a flexible coupling comprising arm or spider members 21, 22, slidably engaged with a driving ring or disc 23, such parts constituting an Oldham coupling. Shafts 12 and 19 are mounted in suitable bearings 24 and 25. Shaft 20 has its bearings 26 mounted in the inwardly extending housing structure 27 which is formed as a part of the floating equalizer box member 28.

The equalizer box member just described extends longitudinally along one side of the main frame structure 2 and is free to rock and to move up and down in a vertical plane paralleling such frame structure, but is restrained as against relative lateral movement or displacement with respect to the frame by means of the recesses 29 on the floating box structure and the cooperating fixed guide lugs 30 on the frame. Said box structure serves to house the journals of the axles 31 and transmit the weight of the superstructure or main body of the locomotive to said axles and thence to the wheels, by means of a spring device 32 which is connected at its ends through links 33 to fixed points 34 on the frame, and which bears at its mid-part, as by a saddle 35, upon the mid-portion of the said equalizer box. The driving connection from shaft 20 to the axles is by means of the driving bevel gear 36, the driven gears or pinions 37, the longitudinal shafts 38 with their gears 39 and the driven ring gears 40 which are held in constantly aligned position with the driving gears 39 by means of the ring gear bearings 41 mounted in the housing portions 42 of said box 28. The immediate connection between each driven ring gear 40 and its axle is by means of a flexible coupling comprising driving and driven parts 44, 43 and an intermediate member or driving ring 45 having a sliding slot-and-lug engagement with the parts 43, 44. Suitable bearings 46 are provided for the shafts 38, and housing covers 47, 47 and 48 are provided for the gear sets.

At the opposite side of the locomotive (and as best seen in Fig. 5) the axles 31 are journalled in boxes 31a, which ride in pedestal-ways 31b, and upon each of which the frame bears by means of a suitable spring (not shown).

The arrangement of the running gear just described provides for free movement of the axles with relation to each other, to accommodate track conditions, as well as for proper play of the axles with respect to the frame of the locomotive and the fixed part of the power and driving mechanism mounted on the locomotive.

Since a locomotive of this character, which is especially adaptable to switching and shunting, and to operate under heavy loads of varied magnitude, over rough track and irregular grades and curves, involves the utilization of a power plant of variable speed but of substantially constant torque over a predetermined speed range, I provide a variable-ratio power transmission mechanism, the preferred form of which is a variable speed selective gear transmission, indicated generally at 49, said transmission being coupled, or capable of being coupled, to the shafting 12 to drive the same, and to the prime mover 7 to be driven by the latter; the connection of the variable transmission with the prime mover being through the intermediation of a flexible clutch or coupling device indicated in general at 50. This coupling device, as well as the power plant, variable-ratio transmission, driving mechanism, and, in fact, the vehicle as a whole, may take various forms; but I prefer to use the elements shown, including a fluid or hydraulic coupling, which by inherent design, or by proper means of regulation may conveniently be arranged to slip, under certain predetermined conditions, as when the resistance of the vehicle imposes a resistance or load upon the driven side of the coupling which exceeds the engine torque, for example when starting or when a difference in speed between the engine shaft and the driven shaft is introduced for example by a change in the gear ratio.

The general arrangement of the locomotive, in addition to power plant, fluid coupling, selective ratio transmission, and running gear, further contemplates a governing mechanism for the speed or power output of the prime mover 7, said governing mechanism which is generally indicated at 51 in Figure 1a, (and in detail in Fig. 1c) being placed under the influence of the shafting 52 which connects the driven side of the clutch or coupling device to the variable-ratio transmission 49.

Figure 1C:
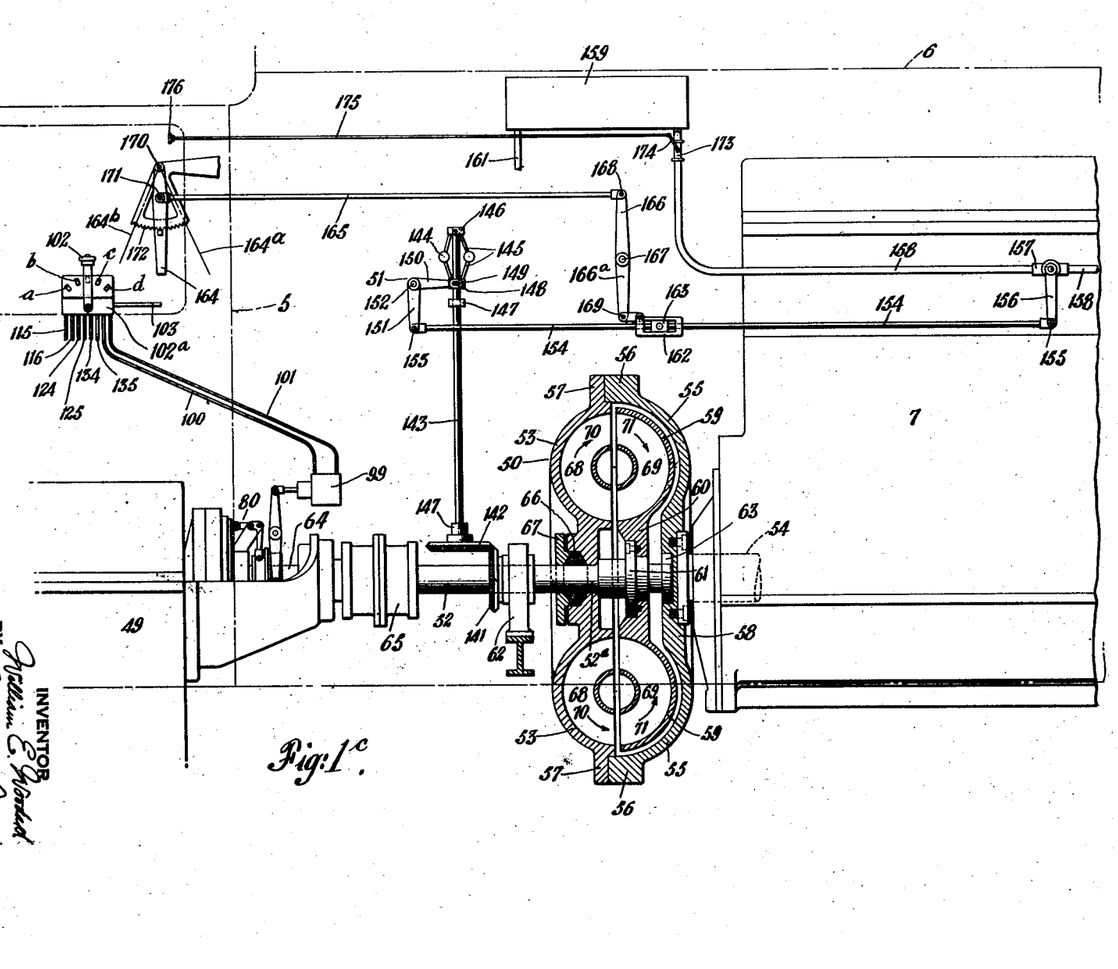
Figure 1c is an enlarged vertical section through a flexible or fluid coupling mechanism (which is seen in dotted lines in Fig. 1a), showing in elevation the governing mechanism and parts of the power plant and the variable-ratio transmission, and illustrating the co-operative relationship between said elements.

By reference more specifically to Figure 1c, it will be seen that the fluid coupling, which is constantly in engagement, or in condition to drive, includes a driving runner or fluid impeller 53 mounted fast on the main prime mover or crank shaft 54, through the intermediation of the casing member 55, which latter has an outward extension or peripheral flange 56 for bolting or otherwise securing it to the flange 57 of the runner 53, and an inward extension or central portion 58 which is fixed on said shaft 54. The driven member or turbine wheel 59 of the coupling is connected as by flange 60 fixedly to the flange 61 of the shaft 52, said driven shaft 52 having suitable bearings 62 and 63 and being connected to the primary shaft 64 of the variable speed transmission by means of a suitable connection such as a flexing joint 65. Since that portion 52a of shaft 52 which lies between the bearings 62 and 63 must rotate with the driven part or rotor 59 of the coupling, it is provided with a suitable packing or stuffing box 66, so as to form a leak-proof rotatable joint with respect to the primary or driving element 53 of the coupling. The packing may be tightened by any suitable device such as the gland 67 bolted to the primary runner 53.

The two runners 53 and 59, have, respectively, driving and driven vanes or blades 68 and 69, disposed in such manner that the passages between the blades of one runner have their fluid entrances and exits, respectively, opposite the exits and entrances of the passages of the other runner. With the passages of the runners wholly or partially filled with a suitable driving fluid, such as oil, rotation of the impeller 53 causes a fluid flow in the direction of the arrow 70, which flow reacts against the blades 69 in its return flow indicated at 71 in such manner as to drive the runner or turbine 59. A spiral or helical path of fluid flow, more or less perfect according to the degree of slippage of the coupling, thus results, upon rotation of the coupling members and the circulation of the fluid resulting therefrom, this being well-known in the fluid clutch art.

Normal minimum slippage of the fluid coupling shown is predeterminedly arranged to be between about one percent (1%) and five percent (5%). However, the invention is not limited in its broad aspects to any particular type of coupler, since other flexible clutches or coupling means may be employed.

The delivery of power from the driven side of the flexible or fluid clutch or coupling to the drive shaft 12 of the driving mechanism which is associated with the reversing clutch and thence with the driving mechanism adjacent the running gear, is through the intermediation of a suitable variable ratio transmission hereinbefore referred to by the general reference character 49. Said transmission may, of course, take various forms, within the scope of the present invention, although it is preferable that suitable means be provided for effecting rapid change-over from one ratio to another so as to avoid appreciable break in the load on the power plant and in the transmission of a driving torque to the wheels. In this connection, it should be stated that the present disclosure illustrates a four-speed gear transmission and I have shown air-actuated high speed clutches for effecting the changes in ratio. This mechanism will now be described.

Figure 2:
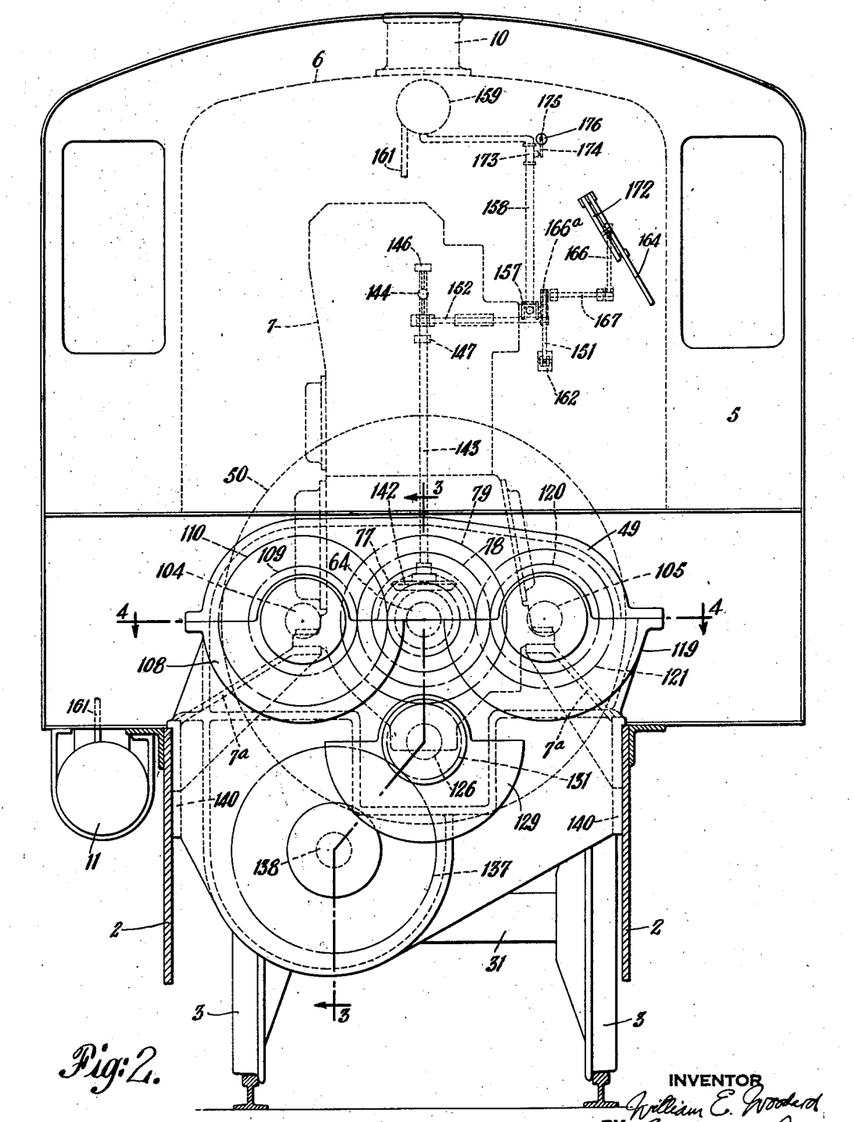
Figure 2 is an enlarged section on line 2—2 of Figure 1a, showing the chief elements of the power transmission mechanism of the locomotive of Figures 1a and 1b, indicating in dotted outline the power plant and its hood and in section certain portions of the locomotive frame, but omitting certain parts such as the driving connections to the wheels.
Figure 3:
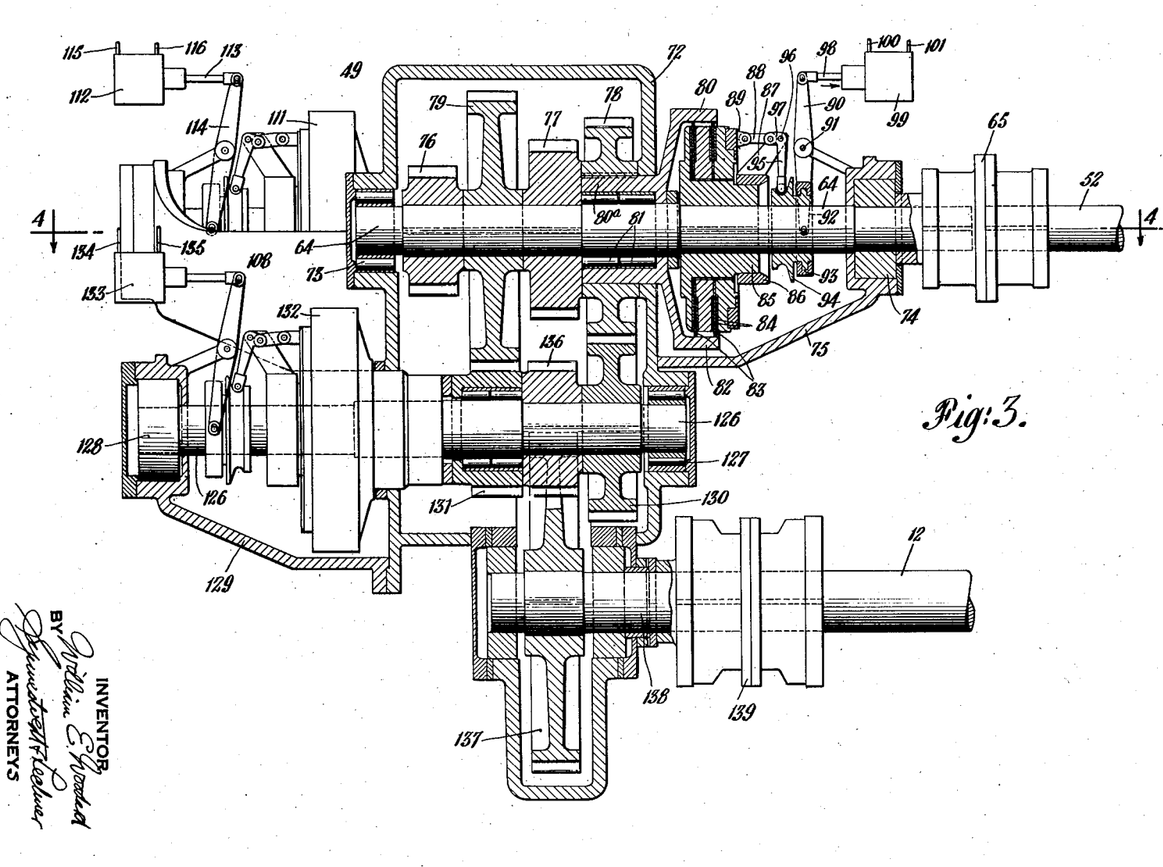
Figure 3 is a further enlarged, irregular, vertical section through the structure of Figure 2 (generally on the line 3—3 of Figure 2), with certain parts shown in elevation.
Figure 4:
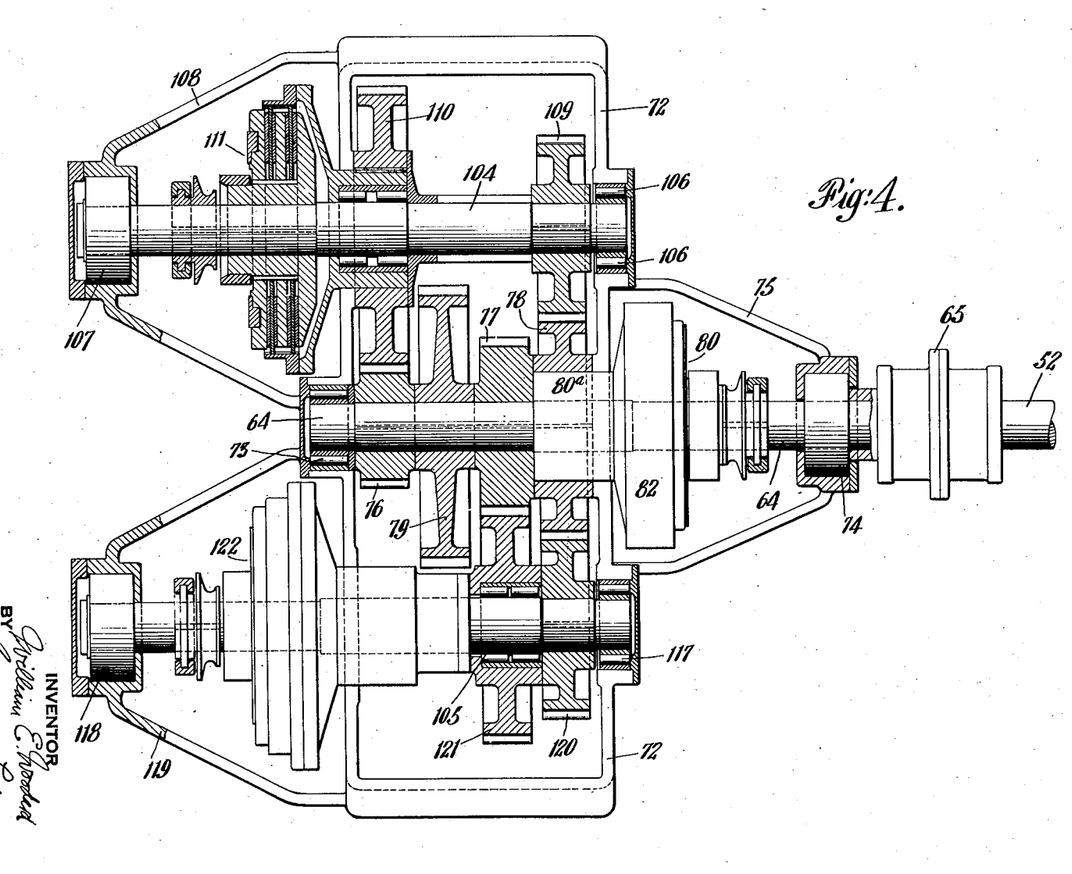
Figure 4 is a horizontal section taken on the line 4—4 of Figures 2 and 3, with certain parts in elevation.

As best shown in Figures 2, 3 and 4, it will be seen that the primary shaft 64 of the transmission 49 is axially aligned with and driven by the shafting 52 which is connected with the driven side of the fluid coupler 50. This shaft 64 is carried in the casing 72 of the transmission by means of suitable bearings 73, 74, the latter bearing being supported by a suitable extension 75 projecting forwardly from the main portion of the transmission casing 72. Said shaft further carries four gears 76, 77, 78 and 79, gear 76, 77 and 79 being keyed fast to the shaft, while gear 78 is keyed to the clutch sleeve 80a of the clutch indicated generally at 80. Said clutch sleeve 80a is mounted for free relative rotation with respect to shaft 64 by the intermediation of suitable bearings 81.

The floating clutch sleeve 80a carries, externally of the casing 72, a flanged or dished member 82 having clutch plates 83 secured thereto. Cooperating clutch plates or discs 84, mounted for rotation with the shaft 64 by means of the parts 85, 86, 87, 88 and 89, may be forced into driving engagement with the clutch discs 83 by means of a suitable clutch operating lever 90 which is pivoted at 91 to a fixed point and engages by means of a suitable fork and ring construction 92, 93, the axially slidable clutch collar 94. When the member 94, as seen in Figure 3, is moved to the left (which is the position shown in Figure 3) the bell crank lever 95 which is pivoted at 96 on the bracket-like member 87, operates the other arm 97 of the bell crank to actuate the connection 88 as a toggle.

Driving engagement between the driving clutch discs 84 and the driven clutch discs 83, and thus between the shaft 64 and the gear 78 which is driven through the clutch is thus effected by an actuation of the clutch motor operating rod 98 in the direction indicated by the arrow. Clutch 80 of Fig. 3 is in engaged position.

While the details of the clutch operating motor and the compressed air mechanism therefor are not herein fully disclosed, yet an adequate understanding of the operation thereof may be obtained from inspection of Figures 1a and 3, from which it will be seen that the motor device 99 by delivery of compressed air or other operating fluid through one or the other of the pipes 100, 101 may be made to engage or disengage the clutch. A suitable air control valve 102a, located in the cab and receiving compressed air from any suitable source by means of the pipe 103, may have an operating lever 102 movable from neutral into any of four positions, a, b, c and d for the four clutch operating motors, one of which has just been described.

From Figures 2 and 4 it will be seen that a shaft 104 is located in the transmission to the left of the main shaft 64 and that a shaft 105 is located at the right of the main shaft 64. Shaft 104 is journaled at 106 and 107, in the main gear casing 72 and in the extension 108, respectively. This shaft has a gear 109 fixed on the shaft 104 and constantly in mesh with gear 78; and has another gear 110, normally floating with respect to shaft 104 and in constant mesh with gear 76. Gear 110 may be clutched fast to the shaft 104 by means of a suitable clutch mechanism indicated at 111. The details of this clutch mechanism are substantially the same as the details of clutch 80, and, to avoid repetition, will not here be described. Suffice it to say that there is a clutch operating motor 112 with suitable rod and lever 113, 114 and air supply pipes 115, 116.

Referring again to shaft 105, it will be seen that this is journaled at 117 in the main casing 72 and at 118 in the casing extension or bearing support 119. Gear 120, fixed on shaft 105, is in constant mesh with gear 78. Gear 121, floating with respect to the shaft 105, is in constant mesh with gear 77. A suitable clutch 122 is provided to drivingly connect shaft 105 and gear 121, as before described with respect to gears 78 and 110. The clutch operating motor 123 for the clutch 122 is shown in Figure 1a, and to operate this motor I provide another pair of pipes 124, 125.

In the vertical mid plane of the transmission beneath the main shaft 64, is another shaft 126, best seen in Figure 3. This shaft is suitably journaled at 127, 128, the latter bearing being in the support or housing 129. Gear 130, fast on shaft 126, is in constant mesh with gear 78. Floating gear 131 is in constant mesh with gear 79 and may be clutched to the shaft 126 by means of the clutch 132, which latter has an operating motor 133 with suitable pipes 134, 135. Intermediate the two gears 130, 131, the shaft 126 carries a third gear 136, which is fast on the shaft and is in constant mesh with the large gear 137 carried on the lowest and final shaft 138 of the transmission, this shaft, as seen in Figure 2, being offset laterally from the mid plane of the transmission. The final transmission shaft is coupled to the longitudinal locomotive driving shaft 12 by means of any suitable coupling device 139 which will permit a certain degree of flexibility or angling, similar to the coupler 65 which connects the shafting 52 of the fluid coupling with the primary shafting 64 of the transmission. Another coupling 139a is also preferably provided in shaft 12.

As will be seen in Figure 2, a good stout support for the transmission as a whole is provided by the flange structure 140 which is mounted on the main longitudinal frame members 2 of the locomotive. This serves also to brace and stiffen the frame structure and thus the locomotive as a whole, as do also the bracket members 7a which support the Diesel engine on the main frame.

While the clutch operating mechanism is only diagrammatically shown, it will be understood that the operating lever 102 in the cab controls a distributing valve mechanism, which should be so arranged as to enable the operator to throw in selectively, by placing the lever 102 in the respective positions a, b, c or d, any single one of the four clutch mechanisms 111, 122, 80 and 132. It will be seen that operation through any one of the four speeds may be had in either forward or reverse gear, since the reversing clutch mechanism 14 (Fig. 5) is independent of the variable ratio transmission. For the Diesel engine here shown and for the size of locomotive and drivers chosen, I have employed for first speed or low gear (position a of the control valve) an overall ratio between the shaft 52 and the driving axles of 12.5 to 1. For second, or b position, I have employed a ratio of 7.26 to 1; for third or c position, a ratio of 4.38 to 1; and for fourth or d position, a ratio of 2.44 to 1; and the transmission here illustrated gives substantially these ratios when driving through the axle gears shown.

In tracing out the operation of the gears, it should first be noted that no gears are shifted, all meshing being constant, and all ratio changes being accomplished by the quick action of the air operated clutches, which might as easily be arranged to be operated by electricity or some other means; and I have utilized this form of transmission in the preferred embodiment of the invention as it serves very adequately to accomplish the quick change in ratio which is desired according to the present invention. To throw the transmission into low gear, clutch 111 is engaged, and the train of connection from the primary shaft 64 to the last shaft 138 of the transmission is by means of gears 76 and 110, shaft 104, gears 109, 78 and 130, shaft 126 and gears 136 and 137. For second gear, clutch 122 is engaged, and the drive from shaft 64 to shaft 138 is by means of gears 77 and 121, shaft 105, gears 120, 78 and 130, shaft 126 and gears 136 and 137. For third gear, clutch 80 is engaged, and the drive is by means of gears 78 and 130, shaft 126 and gears 136 and 137. For fourth or high gear, clutch 132 is engaged, and the drive is by way of gears 79 and 131, shaft 126 and gears 136 and 137.

In the foregoing description of transmission operation, it will, of course, be understood that only one of the four clutches is engaged at any one time, the movement of the control element 102 to any position, a, b, c or d automatically throwing in one clutch and ensuring the disengagement of all the others.

Returning now to the driven side of the fluid coupling 50, it will be seen from Figures 1a, 1b and 1c that I couple thereto, or preferably to the driven shafting 52, the governing mechanism 51, by means of a bevel gear 141 which is fast on shaft 52 and a cooperating bevel gear 142 which is fast on governor shaft 143. The governor shaft rotates the governor weights 144 which are carried on links or straps 145, by means of the fixed collar 146. Suitable bearing devices 147 are provided for the shaft 143, one of which may be utilized to serve also as a stop, if desired, to limit the downward movement of the movable collar 148 of the governor. Said collar 148 is pivotally coupled, as by a pin and cooperating fork device 149, to one arm 150 of a bell crank, the other arm 151 of which extends from the bell crank fulcrum shaft 152 to a pivotal connection 153 with the throttle control rod 154. The rod, at its forward end, is pivoted, as at 155 to the operating arm or lever 156 of the fuel supply valve or throttle 157 located in the supply pipe 158 which extends from the auxiliary fuel tank 159 to the fuel pump, atomizing or spray mechanism, or carburetor, of the prime mover, indicated generally at 160 (the details of the prime mover and of the pumping, atomizing or carbureting mechanism being not shown as they may be of standard Diesel engine or gasoline engine design). The auxiliary fuel tank 159 may readily be fed by any suitable pumping or suction means (not shown), from the main fuel tank 11 by means of the fuel pipe line 161. The control rod 154, however, may be connected to any suitable speed or power output control device, depending upon the type of engine or power plant employed.

At any suitable point in the governing and control mechanism for the engine, for example between the governor 51 and the fuel control valve 157, I provide means for limiting the range, or at least the maximum point of the range, of operation; or in other words, I superimpose an ultimate limit control upon the operation of the governing mechanism, and I preferably construct such limiting means as a manually-operable device. The form of mechanism shown comprises a guideway 162 of predetermined length in which the block 163 (which is fast on rod 154) may move within the limits determined. The setting of the member 162 may be varied at will by the manual control element 164, through the intermediation of rod 165, and levers 166 and 166a, which latter are fixed on shaft 167 and pivotally connected at 168 and 169, respectively, to the rod 165 and the stop or guide element 162.

The control element 164 may comprise a device similar to an ordinary throttle lever, fulcrumed at 170, pivotally connected to the operating rod 165 at the point 171, and operating over a suitable quadrant 172.

In the operation of the vehicle as a whole, assuming that the particular load being hauled requires a maximum power output from the engine 7, the steps of the operation will be as follows:

Idling valve 173, through its arm 174, rod 175 and cab control 176, is pulled out of idling position to full open position.

Reversing clutch 14 is then set for either forward or reverse operation (as desired).

Transmission lever 102 is then thrown into position a for low gear operation and the manual control member 164 is moved from position 164a (at which position throttle valve 157 stands open at a point which effects engine operation at minimum operating speed under load) to position 164b which leaves the throttle valve 157 free for control by the governor mechanism 51 as the latter comes into action. Since, at this moment, the axles 31 of the vehicle are not rotating, the shaft 52 is at a standstill and the continued rotation of the prime mover is permitted by slippage of the fluid coupling. Under these conditions, the coupling is operating with its extreme or maximum slippage. This slippage is gradually reduced as the shaft 52, and the vehicle as a whole, comes into motion, until the load is accelerated up to the point where the shaft 52 is rotating at a speed only slightly less than the shaft of the prime mover, the remaining difference in speed being that involved in the normal minimum coupling slippage, plus a predetermined amount provided by the setting of the governor to ensure acceleration and to make the engine always lead the driven side of the coupling.

This relationship, that is, when the driven shafting 52 has attained a speed only less than the engine speed by the amount equivalent to the minimum normal coupling slippage plus a small amount to ensure acceleration will hereinafter be referred to as "normal relative speed" of the driven shafting. When shafting 52 has reached "normal relative speed" for minimum operating engine speed under load, the governor mechanism 51 operates to speed up the engine as rapidly as the vehicle and its load are accelerated, until maximum engine speed has been attained.

When the load has been fully accelerated, under the low-gear transmission ratio, the transmission is quickly changed into second gear. Since this gear involves a normal ratio between the engine and the wheels of only about 7 to 1, instead of about 12 to 1 as in first gear, the rapid change from first to second gears involves a sudden reduction in the speed of rotation of the shafting 52 at the driven side of the fluid coupling. This is again taken up by slippage of the coupling until the governor mechanism brings down the speed of the prime mover to a point only slightly in the lead of the speed of the shafting 52, or in other words to the point where the engine shaft and the driven shaft are again at "normal relative speed". As the load is accelerated on this ratio, the throttle is again progressively opened under the action of the governor. The same operation takes place upon a change in ratio from second gear to third gear, and from third gear to high gear.

In going from a higher gear to a lower gear, the ratio is, as before, quickly changed so that there is no appreciable lag or gap in the power applied to the wheels. The fluid coupling as before accommodates the altered conditions imposed by the change in ratio of the driving connections, by slippage to the degree necessary, and the governor promptly comes into play to control the throttle of the prime mover to a point where the fuel supply will be slightly in excess of the amount which would be theoretically required to carry the load on the changed ratio plus the work lost in the normal minimum slip of the coupler.

It will now readily be seen that a result of the locomotive operation as described is the utilization of the prime mover throughout its speed range at maximum efficiency under all conditions of operation, and that any interruption of the load on the prime mover for changing the ratio and any lag or interruption in the power applied to the wheels is reduced to a minimum; and further, the operation automatically provides for a constant tendency of the prime mover to pick up or accelerate the load at the best predetermined rate of acceleration and with minimum slippage under all normal operating conditions.

It will furthermore now be seen that a positive manual check is placed or superimposed upon the automatic operation of the mechanism by means of the control lever 164 which, by variation in its setting, can be arranged to provide for any desired maximum throttle opening, through the intermediation of the interlock or positive stop device 162, 163. Thus, if it is desired to haul the load at less than the extreme maximum power output, the engineer can place the lever 164 at any desired point intermediate the positions 164a and 164b, and the point so chosen will determine the maximum acceleration under the action of the governor.

All of the recited advantages, and the various objects set out at the beginning of this specification are thus very readily obtained by the present invention, by a construction which is relatively simple, inexpensive, light in weight, easy to operate, and in fact in large part automatic, as compared with vehicle and especially locomotive constructions heretofore employed for similar fields of operation. Other advantages may be incident to the invention or may readily occur to those skilled in this art, and as before indicated, various different structures may be utilized in carrying out the method of operation, or as embodiments of the structure broadly defined herein, and I, therefore, do not limit myself to the specific mechanism shown, so far as the broader aspects of the invention are concerned.

What I claim is:—

1. In combination, a variable speed prime mover capable of producing a substantially constant torque over a predetermined speed range, a driven shaft, a clutch being capable of slippage, a variable speed transmission on the driven shaft, automatic governing means operable under the influence of said driven shaft or the driven part of the clutch to control automatically the energy input to the prime mover whereby to compensate for varying speed changes of the transmission device, and manually operable means for controlling at will an extreme limit of the operation of the automatic governing means.

2. In combination, a variable speed prime mover, a transmission device capable of variable slippage while delivering a predetermined torque, being connected with said prime mover, and including a driven member adapted to perform work, speed governor means for said prime mover automatically operable under the influence of said driven member, and means for determining at will the limit of operation of the speed governor means.

3. In a locomotive or the like, the combination of a variable speed prime mover, a fluid or hydraulic coupling having a driving runner and a driven runner relatively actuable by a fluid associated therewith, said driving runner being connected to said prime mover, a variable-ratio transmission having connection with the running gear of the locomotive, said driven member of the coupling being connected with the said variable-ratio transmission, power means for quickly varying the transmission ratios without disengaging said coupling, control means for said power means, and an automatic synchronizing controller having actuating connection from the driven member of the coupling whereby it is responsive to speed changes imposed by transmission ratio variation and having means coupled with the prime mover power input whereby to effect restoration of a predetermined speed relationship between the prime mover and said driven member.

4. In a locomotive or the like, the combination of a prime mover, a fluid or hydraulic coupling having a driving runner and a driven runner relatively actuable by a fluid associated therewith, said driving runner being connected to said prime mover, a variable-ratio transmission having connection with the running gear of the locomotive, said driven member of the coupling being connected with the said variable-ratio transmission, and means for variably controlling the speed or power output of the prime mover, said control means including a governor device having operating connection taken off between the driven member of the coupling and the primary driven element of the variable-ratio transmission.

5. In a locomotive or the like, the combination of a prime mover, a fluid or hydraulic coupling having a driving runner and a driven runner relatively actuable by a fluid associated therewith, said driving runner being connected to said prime mover, a variable-ratio transmission having connection with the running gear of the locomotive, said driven member of the coupling being connected with the said variable-ratio transmission, means for variably controlling the speed or power output of the prime mover, said control means including a governor device having operating connection taken off between the driven member of the coupling and the primary driven element of the variable-ratio transmission, and a manual control superimposed over the action of the governor device to limit its operation to a predetermined zone.

6. In a locomotive or the like, the combination of a variable speed prime mover, power connections between said prime mover and wheels of the vehicle including a driving coupling capable of slippage under certain predetermined conditions, and governor mechanism for controlling the operation of the prime mover under the influence of the driving connections between the wheels and the driven side of the coupling and having operating mechanism arranged to increase the effective fuel supply upon increase in speed of the driving connections at the driven side of the coupling, and to decrease the effective fuel supply upon decrease in speed of the driving connections at the driven side of the coupling.

7. In a locomotive or the like, the combination of a variable speed prime mover, power connections between said prime mover and wheels of the vehicle including a driving coupling capable of slippage under certain predetermined conditions, and governor mechanism for controlling the operation of the prime mover under the influence of the driving connections between the wheels and the driven side of the coupling and having operating mechanism arranged to increase the effective fuel supply upon increase in speed of the driving connections at the driven side of the coupling, and to decrease the effective fuel supply upon decrease in such speed, said governor being so set or arranged that the effective fuel supply to the prime mover will be slightly in excess of the amount which would be theoretically required to carry the imposed load plus the work lost in the slip of the coupler.

8. In a locomotive or the like, the combination of a variable speed prime mover, power connections between said prime mover and wheels of the vehicle including a driving coupling capable of slippage under certain predetermined conditions and a variable-ratio transmission mechanism, and governor mechanism for controlling the operation of the prime mover under the influence of the speed of the driving connections between the variable-ratio transmission and the driven side of the coupling and having operating mechanism arranged to increase the effective fuel supply upon increase in speed of the driving connections at the driven side of the coupling, and to decrease the effective fuel supply upon decrease in such speed, said governor being so set or arranged that the effective fuel supply to the prime mover will be slightly in excess of the amount which would be theoretically required to carry the imposed load plus the work lost in the slip of the coupler under all ratios of operation in the transmission.

9. In a locomotive or the like, the combination of a variable speed prime mover having a substantially constant torque over a predetermined speed range, power connections between said prime mover and wheels of the vehicle including a driving coupling capable of slippage under certain predetermined conditions, and governor mechanism for controlling the effective fuel supply to the prime mover under the influence of the driving connection means between the wheels and the driven side of the coupling and having operating mechanism arranged to increase the effective fuel supply upon increase in speed of the driving connections at the driven side of the coupling, and to decrease the effective fuel supply upon decrease in such speed, and a variable control for determining the maximum limit of the automatic range of the governor mechanism.

10. In a locomotive or the like, the combination of a variable speed prime mover having a substantially constant torque over a predetermined speed range, power connections between said prime mover and wheels of the vehicle including a driving coupling capable of slippage under certain predetermined conditions, and governor mechanism for controlling the effective fuel supply to the prime mover under the influence of the driving connection means between the wheels and the driven side of the coupling and having operating mechanism arranged to increase the effective fuel supply upon increase in speed of the driving connections at the driven side of the coupling, and to decrease the effective fuel supply upon decrease in such speed, said governor being so set or arranged that the power output of the prime mover will be slightly in excess of the amount which would be theoretically required to carry the imposed load plus the work lost in the slip of the coupler, and a variable control for determining the maximum limit of the automatic range of the governor mechanism.

11. In a locomotive or the like, the combination of a variable speed prime mover having a substantially constant torque over a predetermined speed range, power connections between said prime mover and wheels of the vehicle including a driving coupling capable of slippage under certain predetermined conditions and a variable-ratio transmission mechanism, and governor mechanism for controlling the effective fuel supply to the prime mover under the influence of the speed of the driving connection means between the variable-ratio transmission and the driven side of the coupling and having operating mechanism arranged to increase the effective fuel supply upon increase in speed of the driving connections at the driven side of the coupling, and to decrease the effective fuel supply upon decrease in such speed, said governor being so set or arranged that the power output of the prime mover will be slightly in excess of the amount which would be theoretically required to carry the imposed load plus the work lost in the slip of the coupler, under all ratios of operation in the transmission, and a variable control for determining the maximum limit of the automatic range of the governor mechanism.

12. In apparatus for the transmission and control of power, the combination of a variable speed prime mover, power connections between the same and a point of use including a driving coupling capable of slippage under certain predetermined conditions, a speed control means for the prime mover normally set to permit a predetermined minimum operating speed thereof under load, and governor means operable under the influence of the driving connections at the driven side of the coupling to control the operation of the prime mover in a range above said minimum and constructed to normally maintain a predetermined relative speed between said prime mover and said connections.

13. In apparatus for the transmission and control of power, the combination of a variable speed prime mover, power connections between the same and a point of use including a driving coupling capable of slippage under certain predetermined conditions, a speed control means for the prime mover normally set to permit a predetermined minimum operating speed thereof under load, and governor means operable under the influence of the driving connections at the driven side of the coupling to control the operation of the prime mover in a range above said minimum and contructed to normally maintain a predetermined relative speed between said prime mover and said connections, together with means for altering at will the upper limit of the automatic operation of said governor means.

14. In apparatus for the transmission and control of power, the combination of a variable speed prime mover, power connections between the same and a point of use including a driving coupling capable of slippage under certain predetermined conditions, a speed control means for the prime mover normally set to permit a predetermined minimum operating speed thereof under load, and governor means operable under the influence of the driving connections at the driven side of the coupling to control the operation of the prime mover in a range above said minimum and constructed to normally maintain a predetermined relative speed between said prime mover and said connections, together with means for operating the said prime mover at idling speed.

15. In apparatus for the transmission and control of power, the combination of a variable speed prime mover, power connections between the same and a point of use including a driving coupling capable of slippage under certain predetermined conditions, a speed control means for the prime mover normally set to permit a predetermined minimum operating speed thereof under load, and governor means operable under the influence of the driving connections at the driven side of the coupling to control the operation of the prime mover in a range above said minimum and constructed to normally maintain a predetermined relative speed between said prime mover and said connections, together with means for altering at will the upper limit of the automatic operation of said governor means and means for operating the said prime mover at idling speed.

WILLIAM E. WOODARD.